United States Patent
Suga et al.

(10) Patent No.: US 10,026,988 B2
(45) Date of Patent: Jul. 17, 2018

(54) LITHIUM ION SECONDARY BATTERY

(71) Applicant: Automotive Energy Supply Corporation, Zama-Shi, Kanagawa (JP)

(72) Inventors: Sohei Suga, Zama (JP); Koichi Shinohara, Zama (JP); Kenji Ohara, Zama (JP); Toshihiro Horiuchi, Zama (JP); Masanori Aoyagi, Zama (JP); Junko Nishiyama, Zama (JP)

(73) Assignee: AUTOMOTIVE ENERGY SUPPLY CORPORATION, Zama-Shi, Kanagawa (JP)

( * ) Notice: Subject to any disclaimer, the term of this patent is extended or adjusted under 35 U.S.C. 154(b) by 12 days.

(21) Appl. No.: 15/083,539

(22) Filed: Mar. 29, 2016

(65) Prior Publication Data

US 2016/0294001 A1    Oct. 6, 2016

(30) Foreign Application Priority Data

Mar. 31, 2015  (JP) ................................. 2015-072113

(51) Int. Cl.
*H01M 10/0525*  (2010.01)
*H01M 4/131*  (2010.01)
(Continued)

(52) U.S. Cl.
CPC ....... *H01M 10/0525* (2013.01); *H01M 4/131* (2013.01); *H01M 4/133* (2013.01);
(Continued)

(58) Field of Classification Search
None
See application file for complete search history.

(56) References Cited

U.S. PATENT DOCUMENTS

2007/0202405 A1*  8/2007  Shizuka ............... H01M 4/505
                                                      429/231.3
2016/0028073 A1    1/2016  Ohara et al.

FOREIGN PATENT DOCUMENTS

EP            2975677 A1       1/2016
JP      2011054371 A  *   3/2011
(Continued)

OTHER PUBLICATIONS

Arai et al. JP 2013251281 A, machine translation.*
(Continued)

*Primary Examiner* — Wojciech Haske
(74) *Attorney, Agent, or Firm* — Troutman Sanders LLP

(57) ABSTRACT

Provided is a lithium ion secondary battery including a power generation element, the power generation element including a positive electrode, a negative electrode, a separator, and an electrolyte solution, the positive electrode including a positive electrode current collector, and a positive electrode active material layer provided for the positive electrode current collector, the positive electrode active material layer including a positive electrode active material and binder, the negative electrode including a negative electrode current collector and a negative electrode active material layer provided for the negative electrode current collector, the negative electrode active material layer including a negative electrode active material and binder. The positive electrode has a volume resistivity in a range of 100 Ωcm or more and 700 Ωcm or less after at least one charging and discharging cycle.

2 Claims, 1 Drawing Sheet

(51) Int. Cl.
- *H01M 4/505* (2010.01)
- *H01M 4/525* (2010.01)
- *H01M 4/133* (2010.01)
- *H01M 4/587* (2010.01)
- *H01M 4/62* (2006.01)
- *H01M 4/66* (2006.01)
- *H01M 4/02* (2006.01)

(52) U.S. Cl.
CPC .......... *H01M 4/505* (2013.01); *H01M 4/525* (2013.01); *H01M 4/587* (2013.01); *H01M 4/623* (2013.01); *H01M 4/625* (2013.01); *H01M 4/661* (2013.01); *H01M 2004/021* (2013.01); *H01M 2004/027* (2013.01); *H01M 2004/028* (2013.01); *H01M 2220/20* (2013.01); *Y02T 10/7011* (2013.01)

(56) References Cited

FOREIGN PATENT DOCUMENTS

| | | |
|---|---|---|
| JP | 2011070932 A | 4/2011 |
| JP | 2013251281 A | 12/2013 |
| WO | 2014/142283 A1 | 9/2014 |

OTHER PUBLICATIONS

Toshiro et al. JP 2011054371, machine translation.*
European Search Report dated Jun. 1, 2016 for the corresponding European Patent Application No. 16162730.2.

* cited by examiner

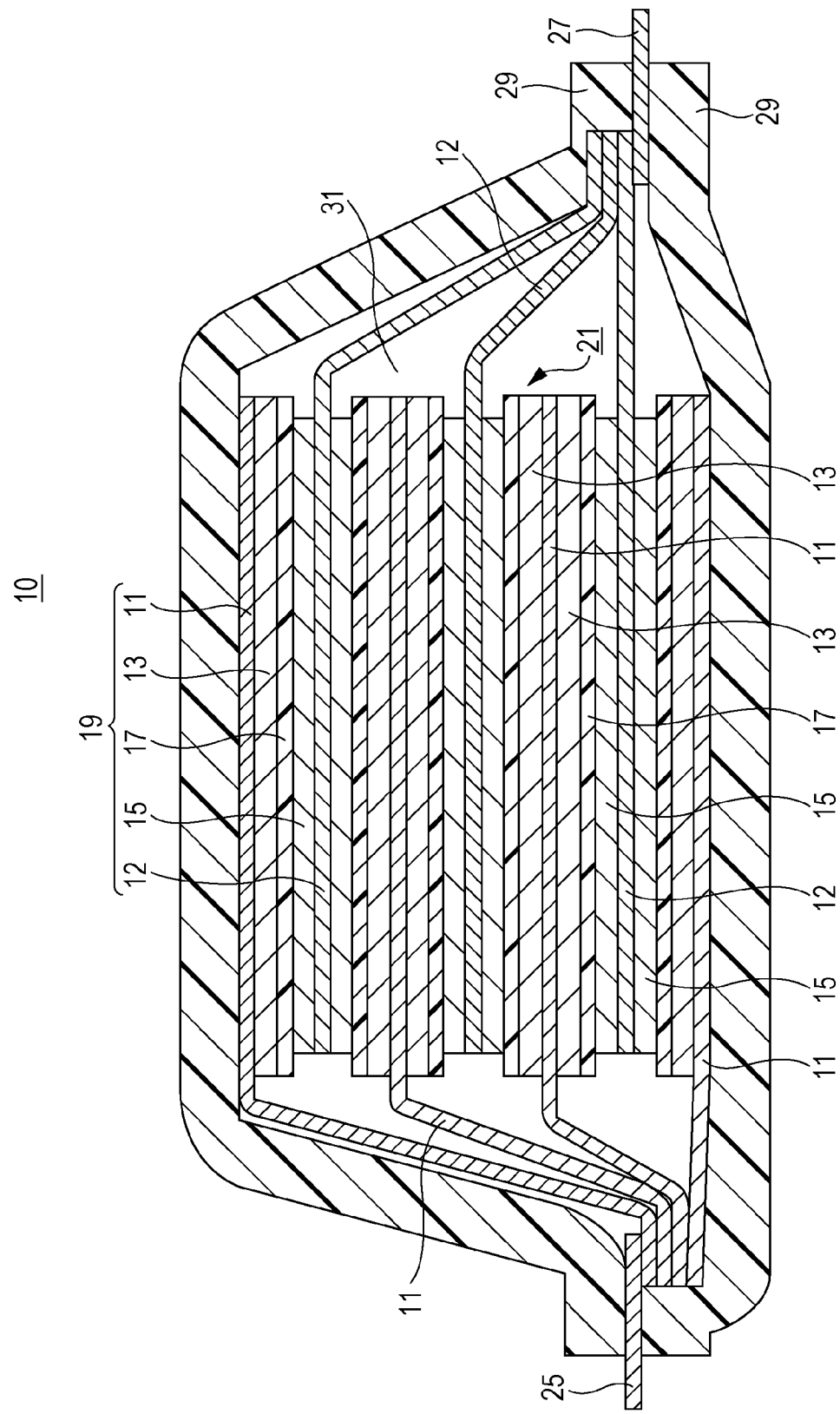

LITHIUM ION SECONDARY BATTERY

CROSS-REFERENCE TO RELATED APPLICATION

This application claims priority from Japanese Patent Application No. 2015-072113 filed with the Japan Patent Office on Mar. 31, 2015, the entire content of which is hereby incorporated by reference.

BACKGROUND

1. Technical Field

The present disclosure relates to a nonaqueous electrolyte battery, particularly to a lithium ion secondary battery.

2. Related Art

Nonaqueous electrolyte batteries have been put into practical use as batteries for vehicles including hybrid vehicles and electric vehicles. Lithium ion secondary batteries used as on-vehicle batteries have been required to have smaller size and higher energy density and moreover to be safe.

In order to suppress the large short-circuiting current between the positive electrode and the negative electrode in the occurrence of short-circuiting between the positive electrode and the negative electrode of the battery, it has been suggested to adjust the electric resistivity of the positive electrode to be within the range of 10 $\Omega \cdot cm$ to 450 $\Omega \cdot cm$ (JP-A-2011-70932). According to JP-A-2011-70932, the short-circuiting current can be suppressed and the deterioration in battery performance can be avoided when the electric resistivity of the positive electrode is adjusted to be within this range.

SUMMARY

A lithium ion secondary battery according to an embodiment of the present disclosure includes a power generation element, the power generation element including a positive electrode, a negative electrode, a separator, and an electrolyte solution, the positive electrode including a positive electrode current collector, and a positive electrode active material layer provided for the positive electrode current collector, the positive electrode active material layer including a positive electrode active material and binder, the negative electrode including a negative electrode current collector and a negative electrode active material layer provided for the negative electrode current collector, the negative electrode active material layer including a negative electrode active material and binder. The positive electrode has a volume resistivity in a range of 100 $\Omega cm$ or more and 700 $\Omega cm$ or less after at least one charging and discharging cycle.

BRIEF DESCRIPTION OF DRAWINGS

FIG. 1 is a schematic sectional view illustrating a lithium ion secondary battery according to one embodiment of the present disclosure.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Even if the electric resistance is adjusted to be within a particular range in the manufacture of the electrodes, subsequently charging and discharging the battery can change the electric resistivity of the electrodes. This is because the binder included in the electrode active material layer swells in the charging and discharging, so that the active material layer expands. The expansion of the active material layer may cause the active material layer to have higher resistance. If the electric resistance of the positive electrode is adjusted to be high in order to suppress the short-circuiting current, the charging performance is deteriorated, and this may adversely affect the cycle life of the battery. In this manner, even if the electric resistance is adjusted to be in the particular range in the manufacture of the electrodes, the battery performance is deteriorated after repeating the charging and discharging of the battery. As a result, the battery life may be shortened. In view of the above, an objective of the present disclosure is to provide a lithium ion secondary battery which can maintain high charging performance and has the improved cycle life.

A lithium ion secondary battery according to the present embodiment includes a power generation element, the power generation element including a positive electrode, a negative electrode, a separator, and an electrolyte solution, the positive electrode including a positive electrode current collector, and a positive electrode active material layer provided for the positive electrode current collector, the positive electrode active material layer including a positive electrode active material and binder, the negative electrode including a negative electrode current collector and a negative electrode active material layer provided for the negative electrode current collector, the negative electrode active material layer including a negative electrode active material and binder. The positive electrode has a volume resistivity in a range of 100 $\Omega cm$ or more and 700 $\Omega cm$ or less after at least one charging and discharging cycle.

The lithium ion secondary battery according to the embodiment has the high charging performance and the long cycle life.

An embodiment of the present disclosure will be hereinafter described. A positive electrode used in this embodiment is a battery member with a shape like a thin plate or a sheet, having a positive electrode active material layer. The positive electrode active material layer is formed by applying or rolling a mixture, which includes a positive electrode active material, binder, and a conductive agent added as necessary, on a positive electrode current collector such as a metal foil, and then drying the mixture. A negative electrode is a battery member with a shape like a thin plate or a sheet, having a negative electrode active material layer. The negative electrode active material layer is formed by applying a mixture, which includes a negative electrode active material, binder, and a conductive agent added as necessary, on a negative electrode current collector. A separator is a film-shaped battery member. The separator separates between the positive electrode and the negative electrode, thereby securing the lithium ion conduction between the positive electrode and the negative electrode. An electrolyte solution is an electrically conductive solution formed by dissolving an ionic substance in a solvent. In this embodiment, in particular, a nonaqueous electrolyte solution can be used as the electrolyte solution. A power generation element including the positive electrode, the negative electrode, the separator, and the electrolyte solution corresponds to one unit of main component members of the battery. In general, a stack including the positive electrode and the negative electrode overlapped (stacked) with the separator interposed therebetween is immersed into this electrolyte solution.

Through at least one charging/discharging cycle, the positive electrode of the lithium ion secondary battery according to this embodiment has the volume resistivity in the range of 100 Ωcm or more and 700 Ωcm or less. The volume resistivity of the electrode refers to the resistance value per unit volume (1 cm×1 cm×1 cm) of the electrode. The volume resistivity of the electrode can be obtained theoretically by measuring the potential difference between the electrodes apart by a predetermined distance when constant current is supplied to a predetermined sectional area.

The positive electrode of the lithium ion secondary battery according to this embodiment has the volume resistivity within the predetermined range not at the time of manufacture of the electrode but after at least one charging/discharging cycle of the battery. This is in order to deal with the following problem: the expected performance of the battery is not obtained no matter how the volume resistivity of the electrode is adjusted before the battery is charged or discharged (i.e., at the time of assembling the battery), because the charging and discharging change the state of the electrode. However, the charging acceptability will be increased if the positive electrode of the lithium ion secondary battery after at least one charging/discharging cycle has the volume resistivity within the range of 100 Ωcm or more and 700 Ωcm or less. In this case, a large amount of current can be accepted in a short period of time and accumulated. Such a lithium ion secondary battery can be used in the application where the steep energy input/output is necessary. Moreover, the energy necessary for the charging can be saved as the electric energy without being dispersed as other energy such as thermal energy. In addition, the discharging output performance is enhanced, so that a large amount of current can be supplied in a short period of time. For these reasons, the lithium ion secondary battery according to this embodiment has the excellent energy efficiency as the on-vehicle battery. In this manner, by the use of the positive electrode having the predetermined volume resistivity through the charging and discharging, the battery can have the improved output characteristic and cycle characteristic.

The lithium ion secondary battery according to this embodiment includes the positive electrode including the positive electrode active material layer disposed on the positive electrode current collector. This positive electrode active material layer includes the positive electrode active material. Preferably, the positive electrode active material layer is obtained by applying or rolling a mixture, which includes the positive electrode active material, the binder, and if necessary the conductive agent, on the positive electrode current collector including a metal foil such as an aluminum foil, and then drying the mixture. As the positive electrode active material, a lithium transition metal oxide can be used. Examples of the lithium transition metal oxide that can be suitably used include lithium nickel oxide (such as $LiNiO_2$), lithium cobalt oxide (such as $LiCoO_2$), lithium manganese oxide (such as $LiMn_2O_4$), and a mixture thereof. As the positive electrode active material, a lithium nickel manganese cobalt composite oxide represented by general formula $Li_xNi_yMn_zCo_{(1-y-z)}O_2$ can be used. In the formula, x is a numeral satisfying $1 \leq x \leq 1.2$, y and z are positive numerals satisfying $y+z<1$, and y is a numeral of 0.5 or less. Containing more manganese makes it difficult to synthesize a composite oxide with a single phase. Therefore, z is preferably a numeral of 0.4 or less. As more cobalt is contained, the cost is increased and the capacity is reduced. In view of this, $1-y-z>y$ and $1-y-z<z$ are preferably satisfied. For achieving the battery with high capacity, it is particularly preferable that $y>z$ and $y>1-y-z$ are satisfied. The lithium nickel manganese cobalt composite oxide preferably has a layer crystal structure.

Examples of the conductive agent that may be used for the positive electrode active material layer include carbon materials including carbon fiber such as carbon nanofiber, carbon blacks such as acetylene black and Ketjen black, activated carbon, mesoporous carbon, fullerenes, and carbon nanotube. For the positive electrode active material layer, an additive usually used for forming the electrode, such as thickener, dispersant, or stabilizer, can be used.

The lithium ion secondary battery according to this embodiment includes the negative electrode including the negative electrode active material layer provided for the negative electrode current collector. This negative electrode active material layer includes the negative electrode active material. Preferably, the negative electrode active material layer is obtained by applying or rolling a mixture, which includes the negative electrode active material, the binder, and if necessary the conductive agent, on the negative electrode current collector including a metal foil such as a copper foil, and then drying the mixture. In this embodiment, the negative electrode active material preferably includes graphite particles and/or amorphous carbon particles. Using the mixed carbon material including both the graphite particles and the amorphous carbon particles improves the regeneration performance of the battery. It is considered that when the amorphous carbon particles with a large interlayer distance (d-value) and a small crystal size (Lc) in the c-axis direction (in a direction perpendicular to (002) plane) are mixed in the negative electrode active material, the lithium ions are easily desolvated in the intercalation of the lithium ions into the negative electrode during the charging. The lithium ion secondary battery including the mixed carbon material used as the negative electrode active material has small overvoltage (resistance) in the charging. Therefore, such a lithium ion secondary battery can be advantageously used as the on-vehicle battery with the set threshold voltage in the charging.

Graphite is the hexagonal crystal carbon material having the hexagonal-plate-like crystal structure. This carbon material is also referred to as black lead or graphite. The preferable shape of the graphite is a particle. The amorphous carbon is the carbon material that is amorphous as a whole and has the random network structure including microcrystal. The amorphous carbon may partly have a structure similar to graphite. Examples of the amorphous carbon include carbon black, cokes, activated carbon, carbon fiber, hard carbon, soft carbon, and mesoporous carbon. The preferable shape of the amorphous carbon used in this embodiment is a particle.

Examples of the conductive agent used as necessary for the negative electrode active material layer include carbon materials including carbon fiber such as carbon nanofiber, carbon blacks such as acetylene black and Ketjen black, activated carbon, mesoporous carbon, fullerenes, and carbon nanotube. For the negative electrode active material layer, an additive usually used for forming the electrode, such as thickener, dispersant, or stabilizer, can be used.

Examples of the binder used for the positive electrode active material layer and the negative electrode active material layer include fluorine resins such as polyvinylidene fluoride (PVDF), polytetrafluoroethylene (hereinafter referred to as "PTFE"), and polyvinyl fluoride (hereinafter referred to as "PVF"), and conductive polymers such as polyanilines, polythiophenes, polyacetylenes, and polypyrroles.

Examples of the separator that separates between the positive electrode and the negative electrode to secure the lithium ion conduction between the positive electrode and the negative electrode include a porous film and a microporous film of polyolefins such as polyethylene and polypropylene.

The electrolyte solution is preferably a mixture of chained carbonate and cyclic carbonate. Examples of the chained carbonate include dimethyl carbonate, diethyl carbonate, di-n-propyl carbonate, di-t-propyl carbonate, di-n-butyl carbonate, di-isobutyl carbonate, and di-t-butyl carbonate. Examples of the cyclic carbonate include propylene carbonate and ethylene carbonate. The electrolyte solution is obtained by dissolving a lithium salt such as lithium hexafluorophosphate ($LiPF_6$), lithium tetrafluoroborate ($LiBF_4$), or lithium perchlorate ($LiClO_4$) in such a carbonate mixture.

The positive electrode of the lithium ion secondary battery according to this embodiment has a volume resistivity of 100 Ωcm or more and 700 Ωcm or less, preferably, 100 Ωcm or more and 300 Ωcm or less after at least one charging and discharging cycle. The charging and discharging cycle of the lithium ion secondary battery here corresponds to the cycle of charging the assembled lithium ion secondary battery and then discharging the charged battery. Specifically, the battery is charged at any of constant current, constant voltage, and constant output until the residual battery capacity (state of charge, hereinafter referred to as "SOC") is increased from 0% to 100%. Next, the charged battery is discharged at any of constant current, constant voltage, and constant output until SOC is reduced to 0%. In the charging and discharging cycle, the charging or discharging may be stopped at any SOC and this SOC may be maintained for a certain period and after that, the charging or discharging may be restarted. The positive electrode of the lithium ion secondary battery according to the embodiment has the volume resistivity within the predetermined range after at least one charging and discharging cycle. The volume resistivity of the positive electrode can be measured by the known method such as a two-terminal method or a four-terminal method. For measuring the volume resistivity without the influence from the contact resistance, the volume resistivity is preferably measured by the four-terminal method.

Here, the volume resistivity of the electrode after the charging and discharging cycle of the battery depends on many factors. The typical factors that have a particularly large influence are described below.

[Composition of Electrode]

Many positive electrode active materials that can be used for the positive electrode for the lithium ion secondary battery generally have high volume resistivity. For this reason, in order to secure the electron conduction path in the positive electrode active material, the material with electron conductivity (conductive agent) is usually mixed. Any material that can provide the electron conductivity at the operation voltage of the battery can be used as the conductive agent. Examples of the carbon material include carbon fiber such as carbon nanofiber, carbon blacks such as acetylene black and Ketjen black, activated carbon, mesoporous carbon, fullerenes, and carbon nanotube. The conductive agent preferably includes at least one of fibrous or particulate metal or graphite. The size of the conductive agent is preferably smaller than the average particle diameter of the positive electrode active material. The conductive agent particularly preferably has an average particle diameter of 100,000 ppm to 1,000 ppm of the average particle diameter of the positive electrode active material. The amount of conductive agent to be mixed is preferably in the range of 3% to 10%, more preferably 6% to 10% relative to the entire mass of the positive electrode active material mixture including the positive electrode active material, the binder, and the conductive agent.

[Specific Surface Area of Electrode Active Material]

The specific surface area of the positive electrode active material is in relation to the speed of the intercalation and deintercalation reactions of lithium ions. Therefore, the specific surface area is an important factor in controlling the volume resistivity of the positive electrode after the battery is charged and discharged. For achieving the excellent ion conduction in the positive electrode, it is necessary to quickly conduct the electrons in the positive electrode. In view of this, it is important to have the positive electrode active material in excellent contact with the conductive agent described above. For having the positive electrode active material and the conductive agent in excellent contact, it is necessary that the microscopic surface area depending on the microscopic shape of the positive electrode active material be in a predetermined range. An example of the microscopic surface area of the positive electrode active material is a BET specific surface area based on a nitrogen adsorption method. The specific surface area of the positive electrode active material measured in this manner is preferably 0.1 to 10.0 $m^2/g$, more preferably 0.5 to 5.0 $m^2/g$.

[Process of Manufacturing Electrode, and Electrode Density]

For improving the performance of the lithium ion battery, the positive electrode active material mixture including the positive electrode active material, the binder, and the conductive agent is preferably dispersed substantially uniformly. If the positive electrode active material mixture is dispersed substantially uniformly, the positive electrode active material and the conductive agent are in excellent contact with each other. Therefore, the intercalation and deintercalation reactions of lithium ions and the electron conduction are improved. Moreover, since there is an appropriate space in the positive electrode active material mixture, lithium ion conduction is improved. Before the positive electrode active material mixture is manufactured, it is preferable that the powder mixture is uniformly stirred in advance using a mixer or the like. By adjusting the pressing pressure so that the positive electrode active material is not destroyed mechanically and the positive electrode current collector is not deformed, the positive electrode with the appropriate electrode density can be manufactured.

In consideration of various factors as above, the positive electrode with a volume resistivity in the range of 100 Ωcm or more and 700 Ωcm or less after the charging and discharging cycles is manufactured. The volume resistivity of the positive electrode is usually increased as the charging and discharging cycles are carried out. When the positive electrode has a volume resistivity of less than 100 Ωcm after the charging and discharging cycles, the voltage drops more in the occurrence of short-circuiting. This causes a problem in the safety of the battery. When the positive electrode has a volume resistivity of more than 700 Ωcm after the charging and discharging cycles, the energy efficiency of the batter is decreased.

A structure example of the lithium ion secondary battery according to the embodiment is described with reference to the drawings. FIG. 1 illustrates an example of the cross section of the lithium ion secondary battery. A lithium ion secondary battery 10 includes, as main components, a negative electrode current collector 11, a negative electrode active material layer 13, a separator 17, a positive electrode current collector 12, and a positive electrode active material layer 15. In FIG. 1, the negative electrode active material layer 13 is provided for each surface of the negative electrode current collector 11 and the positive electrode active material layer 15 is provided for each surface of the positive electrode current collector 12. Note that the active material layer may alternatively be formed on only one surface of each current collector. The negative electrode current collector 11, the positive electrode current collector 12, the negative electrode active material layer 13, the positive electrode active material layer 15, and the separator 17 constitute one battery unit, i.e., are included the power generation element (unit cell 19 in the drawing). A plurality of such unit cells 19 is stacked with the separator 17 interposed therebetween. Extension parts extended from the negative electrode current collectors 11 are collectively bonded onto a negative electrode lead 25. Extension parts extended from the positive electrode current collectors 12 are collectively bonded onto a positive electrode lead 27. The positive electrode lead is preferably an aluminum plate and the negative electrode lead is preferably a copper plate. Depending on the case, a partial coating of another metal (such as nickel, tin, or solder) or a polymer material may be provided. The positive electrode lead and the negative electrode lead are welded to the positive electrode and the negative electrode, respectively. The battery including the stacked unit cells is covered with an exterior body 29 with the welded negative electrode lead 25 and positive electrode lead 27 extracted to the outside. The inside of the exterior body 29 is filled with an electrolyte solution 31.

EXAMPLE 1

<Manufacture of Positive Electrode>

Nickel cobalt lithium manganate (NCM 433, i.e., nickel:cobalt:manganese=4:3:3, lithium:nickel=1:0.4, BET specific surface area=1.1 $m^2/g$) as the positive electrode active material, carbon black powder with a BET specific surface area of 45 $m^2/g$ as the conductive agent, and PVDF as the binder resin were added to N-methyl-2-pyrrolidone (hereinafter referred to as "NMP") as the solvent at 88:8:4 in a solid content mass ratio. To 100 parts by mass of the solid content obtained by eliminating NMP from the above mixture, 0.03 parts by mass of oxalic anhydride (molecular weight: 90) as the organic moisture scavenger was added. The dispersing and mixing in the planetary method were carried out for an hour, thereby preparing a slurry having these materials uniformly dispersed. The obtained slurry was applied onto a 15-µm-thick aluminum foil as the positive electrode current collector. Next, the slurry was heated for 10 minutes at 125° C., thereby vaporizing NMP. Thus, the positive electrode active material layer was formed. By pressing the positive electrode active material layer, the positive electrode having the positive electrode active material layer with a density of 2.5 $g/cm^3$ applied on one surface of the positive electrode current collector was manufactured.

<Manufacture of Negative Electrode>

As the negative electrode active material, the mixed material obtained by mixing graphite powder with a BET specific surface area of 2.0 $m^2/g$ and amorphous carbon powder (hard carbon) with a BET specific surface area of 4.5 $m^2/g$ at a weight ratio of 80:20 was used. This mixed material, carbon black powder with a BET specific surface area of 45 $m^2/g$ as the conductive agent, and PVDF as the binder resin were added to NMP at 92:2:6 in a solid mass content ratio. The obtained mixture was stirred, thereby preparing a slurry having these materials uniformly dispersed in NMP. The obtained slurry was applied on an 8-µm-thick copper foil as the negative electrode current collector. Next, the slurry was heated for 10 minutes at 125° C., thereby vaporizing NMP. Thus, the negative electrode active material layer was formed. By pressing the negative electrode active material layer, the negative electrode having the negative electrode active material layer applied on one surface of the negative electrode current collector was manufactured.

<Manufacture of Lithium Ion Secondary Battery>

Each of the negative electrode and the positive electrode manufactured as above was cut out into rectangular shapes each with a size of 23 cm×11 cm. In the portion where the coating is not applied to which a terminal is to be connected, the positive electrode lead made of aluminum was welded with ultrasonic waves. Similarly, in the portion of the negative electrode plate where the coating is not applied, the negative electrode lead terminal made of nickel with the same size as the positive electrode lead terminal was welded with ultrasonic waves. The negative electrode plate and the positive electrode plate were disposed with the separator interposed therebetween. The separator has a thickness of 25 µm and a porosity of 55% and is made of polypropylene. Thus, the electrode stack was obtained. Except one long side of the two aluminum laminate films, three sides thereof were bonded through heat-sealing, whereby a bag-shaped laminate exterior body was manufactured. Into the laminate exterior body, the electrode stack was inserted. The nonaqueous electrolyte solution was poured into the laminate exterior body and the electrode stack was impregnated with the nonaqueous electrolyte solution in vacuum. Then, the opening portion was heat-sealed under reduced pressure. Thus, the stacked lithium ion battery was obtained. The stacked lithium ion secondary battery was subjected to high-temperature aging several times. Thus, the stacked lithium ion secondary battery with a battery capacity of as high as 5 Ah was obtained. For comparing the volume resistivity before and after the cycle test, a plurality of batteries with the same specification was manufactured.

The nonaqueous electrolyte solution used here was the nonaqueous solvent obtained by mixing propylene carbonate (hereinafter referred to as "PC"), ethylene carbonate (hereinafter referred to as "EC"), and diethyl carbonate (hereinafter referred to as "DEC") at a ratio of PC:EC:DEC=5:25:70 (volume ratio). In this nonaqueous solvent, lithium hexafluorophosphate ($LiPF_6$) as the electrolyte salt was dissolved so that the salt concentration became 0.9 mol/L. To the obtained solution, cyclic disulfonic acid ester (methylene methane disulfonate (MMDS)) and vinylene carbonate as the additive were dissolved each at a concentration of 1 wt %. The finally obtained solution was used as the nonaqueous electrolyte solution.

<Resistance of Battery>

The battery with a residual capacity (state of charge: SOC) of 50% was discharged for 10 seconds at a constant current of 10 A at 25° C. By measuring the voltage when the discharging ended, the battery resistance was obtained. The volume of the battery was measured based on JIS Z 8807 "methods of measuring density and specific gravity of solid—measuring method by weighing in liquid". From the volume of the battery and the resistance of the battery obtained in this manner, the volume resistivity of the battery per unit volume of the battery was calculated.

<Output Density of Battery>

With the use of the battery with an SOC of 50%, the maximum output at which the constant-output discharge at 25° C. for 10 seconds is possible was obtained. The evaluation was made assuming that the output density was the value obtained by dividing the obtained maximum output of the battery by the battery volume.

<Cycle Characteristic Test>

The plurality of stacked lithium ion batteries with the same specification was tested. The volume resistivity of one of the plurality of batteries was used as the measurement sample. The remaining samples were repeatedly charged and discharged at 55° C. at a current of 1 C between an SOC of 0% and an SOC of 100% for a month. After this cycle characteristic test, the output density of the battery was measured.

<Volume Resistivity of Positive Electrode>

The stacked lithium ion secondary batteries before the cycle characteristic test and after the cycle characteristic test were disassembled. The extracted positive electrodes were washed with diethyl carbonate and then dried. With the use of a terminal probe, the positive electrode was sandwiched with a load of 0.091 kg/cm² applied in a direction perpendicular to the main plane thereof. The resistance was measured using the measurement terminal by the four-terminal method that is bonded to the terminal probe.

<Measurement of Voltage Drop Amount of Lithium Ion Battery>

The stacked lithium ion battery manufactured as above was charged up to 4.2 V, and the voltage of the charged battery was measured by a voltage meter. Next, a needle with a thickness of φ=3 mm was penetrated into the battery at a speed of 80 mm/s. After five minutes from the needle penetration, the voltage of the battery was measured again. The value led by the formula: (battery voltage before the needle penetration)−(battery voltage after the needle penetration) (V) was used as the voltage drop amount in the evaluation.

EXAMPLE 2

A positive electrode was manufactured through the same procedure as Example 1 except that the mixed positive electrode active material was formed as the positive electrode active material by mixing spinel manganese with a BET specific surface area of 0.8 m²/g and the composite oxide including lithium nickelate with a BET specific surface area of 0.4 m²/g of which element is partly replaced by cobalt and aluminum (nickel:cobalt:aluminum=80:15:5, lithium:nickel=1:0.8) at a weight ratio of 75/25. The negative electrode and the lithium ion secondary battery were also manufactured through the same procedure as Example 1.

EXAMPLE 3

Nickel cobalt lithium manganate (NCM 433, i.e., nickel:cobalt:manganese=4:3:3, lithium:nickel=1:0.4, BET specific surface area=1.1 m²/g) as the positive electrode active material, carbon black powder with a BET specific surface area of 45 m²/g as the conductive agent, and PVDF as the binder resin were added to NMP as the solvent at 88:8:4 in a solid content mass ratio. To 100 parts by mass of the solid content obtained by eliminating NMP from the above mixture, 0.03 parts by mass of oxalic anhydride (molecular weight: 90) as the organic moisture scavenger was added. The dispersing and mixing in the planetary method were carried out for 30 minutes, thereby preparing a slurry having these materials uniformly dispersed. The obtained slurry was applied onto a 15-μm-thick aluminum foil as the positive electrode current collector. Next, the slurry was heated for 10 minutes at 125° C., thereby vaporizing NMP. Thus, the positive electrode active material layer was formed. By pressing the positive electrode active material layer, the positive electrode having the positive electrode active material layer with a density of 2.8 g/cm³ applied on one surface of the positive electrode current collector was manufactured. The negative electrode and the lithium ion secondary battery were also manufactured through the same procedure as Example 1.

COMPARATIVE EXAMPLE 1

Nickel cobalt lithium manganate (NCM 433, i.e., nickel:cobalt:manganese=4:3:3, lithium:nickel=1:0.4, BET specific surface area=1.1 m²/g) as the positive electrode active material, carbon black powder with a BET specific surface area of 45 m²/g as the conductive agent, and PVDF as the binder resin were added to NMP as the solvent at 88:8:4 in a solid content mass ratio. To 100 parts by mass of the solid content obtained by eliminating NMP from the above mixture, 0.03 parts by mass of oxalic anhydride (molecular weight: 90) as the organic moisture scavenger was added. The dispersing and mixing in the planetary method were carried out for 30 minutes, thereby preparing a slurry having these materials uniformly dispersed. The obtained slurry was applied onto a 15-μm-thick aluminum foil as the positive electrode current collector. Next, the slurry was heated for 10 minutes at 125° C., thereby vaporizing NMP. Thus, the positive electrode active material layer was formed. By pressing the positive electrode active material layer, the positive electrode having the positive electrode active material layer with a density of 2.6 g/cm³ applied on one surface of the positive electrode current collector was manufactured. The negative electrode and the lithium ion secondary battery were also manufactured through the same procedure as Example 1.

COMPARATIVE EXAMPLE 2

Nickel cobalt lithium manganate (NCM 433, i.e., nickel:cobalt:manganese=4:3:3, lithium:nickel=1:0.4, BET specific surface area=1.1 m²/g) as the positive electrode active material, graphite powder with a BET specific surface area of 20 m²/g as the conductive agent A, carbon black powder with a BET specific surface area of 45 m²/g as the conductive agent B, and PVDF as the binder resin were added to NMP as the solvent at 92:2:3:3 in a solid content mass ratio. To 100 parts by mass of the solid content obtained by eliminating NMP from the above mixture, 0.03 parts by mass of oxalic anhydride (molecular weight: 90) as the organic moisture scavenger was added. The mixture was continuously stirred, thereby preparing a slurry having these materials uniformly dispersed. The obtained slurry was applied onto a 15-μm-thick aluminum foil as the positive electrode current collector. Next, the slurry was heated for 10 minutes at 125° C., thereby vaporizing NMP. Thus, the positive electrode active material layer was formed. By pressing the positive electrode active material layer, the positive electrode having the positive electrode active material layer applied on one surface of the positive electrode current collector and having a density of 2.5 g/cm³ was manufactured. The negative electrode and the lithium ion secondary battery were also manufactured through the same procedure as Example 1.

COMPARATIVE EXAMPLE 3

Nickel cobalt lithium manganate (NCM 433, i.e., nickel:cobalt:manganese=4:3:3, lithium:nickel=1:0.4, BET specific surface area=1.1 m$^2$/g) as the positive electrode active material, graphite powder with a BET specific surface area of 20 m$^2$/g as the conductive agent A, and PVDF as the binder resin were added to NMP as the solvent at 86:10:4 in a solid content mass ratio. To 100 parts by mass of the solid content obtained by eliminating NMP from the above mixture, 0.03 parts by mass of oxalic anhydride (molecular weight: 90) as the organic moisture scavenger was added. The mixture was continuously stirred, thereby preparing a slurry having these materials uniformly dispersed. The obtained slurry was applied onto a 15-μm-thick aluminum foil as the positive electrode current collector. Next, the slurry was heated for 10 minutes at 125° C., thereby vaporizing NMP. Thus, the positive electrode active material layer was formed. By pressing the positive electrode active material layer, the positive electrode having the positive electrode active material layer applied on one surface of the positive electrode current collector and having a density of 2.5 g/cm$^3$ was manufactured. The negative electrode and the lithium ion secondary battery were also manufactured through the same procedure as Example 1.

Table 1 shows the positive electrode volume resistivity before the battery is assembled, the positive electrode volume resistivity after the battery is disassembled, the battery initial output density, the battery output density after the cycle test, and the voltage drop amount of the stacked lithium ion secondary batteries according to Examples 1 to 3 and Comparative Examples 1 to 3.

occurrence of short-circuiting. Such a battery has a problem in safety.

Examples of the embodiment have been described so far. However, Examples merely represent some examples of the embodiment according to the present disclosure. Limiting the technical range of the embodiment to the particular embodiment or the specific structure is not intended by the description according to the Examples.

The lithium ion secondary battery according to the embodiment of the present disclosure may be any of the following first to fifth lithium ion secondary batteries.

The first lithium ion secondary battery is a lithium ion secondary battery including a power generation element including a positive electrode in which a positive electrode active material layer including a positive electrode active material and binder is provided for a positive electrode current collector, a negative electrode in which a negative electrode active material layer including a negative electrode active material and binder is provided for a negative electrode current collector, a separator, and an electrolyte solution. The positive electrode has a volume resistivity in a range of 100 Ωcm or more and 700 Ωcm or less after at least one charging and discharging cycle.

The second lithium ion secondary battery is the first lithium ion secondary battery configured such that the positive electrode active material is a lithium nickel manganese cobalt composite oxide with a layer crystal structure represented by a general formula $Li_xNi_yMn_zCo_{(1-y-z)}O_2$.

The third lithium ion secondary battery is the first or second lithium ion secondary battery configured such that the positive electrode has a volume resistivity in a range of 100 Ωcm or more and 300 Ωcm or less.

The fourth lithium ion secondary battery is the second lithium ion secondary battery configured such that the

TABLE 1

| | Positive electrode volume resistivity before assembly (Ωcm) | Positive electrode volume resistivity after disassembly (Ωcm) | Volume resistivity increase rate (times) | Initial output density (W/L) | Output density after 55° C.-cycle test (W/L) | Voltage drop amount (V) |
|---|---|---|---|---|---|---|
| Example 1 | 100 | 258 | 2.6 | 7000 | 6667 | 0.1 |
| Example 2 | 100 | 154 | 1.5 | 6900 | 6571 | 0.1 |
| Example 3 | 68 | 679 | 10.0 | 6850 | 6524 | 0.1 |
| Comparative Example 1 | 168 | 1041 | 6.2 | 5833 | 5072 | 0.1 |
| Comparative Example 2 | 226 | 2626 | 11.6 | 5385 | 4487 | 0.1 |
| Comparative Example 3 | 68 | 91 | 1.3 | 7000 | 6731 | 4.1 |

The positive electrode of the battery according to any of Examples has the volume resistivity in the predetermined range after the charging and discharging cycle. The battery in any of Examples has the large initial output density and large output density after the cycle test. In contrast, if the positive electrode after the charging and discharging cycle has the volume resistivity out of the predetermined range (Comparative Examples 1, 2), such a battery has the small initial output density and small output density after the cycle test. On the other hand, if the positive electrode after the charging and discharging cycle has the volume resistivity less than the predetermined range (Comparative Example 3), such a battery has the output density as high as the batteries of Examples. However, the battery according to Comparative Example 3 exhibits the large voltage drop amount in the positive electrode active material includes a lithium nickel manganese cobalt composite oxide represented by $Li_xNi_yMn_zCo_{(1-y-z)}O_2$ (where x is a numeral of 1 or more and 1.2 or less, y and z are positive numerals satisfying y+z <1, and y is a numeral of 0.5 or less).

The fifth lithium ion secondary battery is any of the first to fourth lithium ion secondary batteries configured such that the negative electrode active material includes graphite particles and amorphous carbon particles.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising a power generation element,
the power generation element including a positive electrode, a negative electrode, a separator, and an electrolyte solution,
the positive electrode including a positive electrode current collector, and a positive electrode active material layer provided for the positive electrode current collector,
the positive electrode active material layer including a positive electrode active material, a conductive agent, and a binder,
wherein the positive electrode active material is a lithium nickel manganese cobalt composite oxide represented by a general formula $Li_xNi_yMn_zCo_{(1-y-z)}O_2$, the oxide being with a layer crystal structure and where x is a numeral of 1 or more and 1.2 or less, y and z are positive numerals satisfying y+z<1, and y is a numeral of 0.5 or less),
wherein the positive electrode active material layer has a density of 2.5 g/cm$^3$,
wherein the conductive agent is carbon black powder with a BET specific surface area of 45 m$^2$/g, and
wherein a composition ratio between the positive electrode active material, the binder, and the conductive agent is 88:8:4,
the negative electrode including a negative electrode current collector and a negative electrode active material layer provided for the negative electrode current collector,
the negative electrode active material layer including a negative electrode active material and binder, wherein
the positive electrode has a volume resistivity in a range of 100 Ωcm or more and 300 Ωcm or less after at least one charging and discharging cycle.

2. The lithium ion secondary battery according to claim 1, wherein the negative electrode active material includes graphite particles and amorphous carbon particles.

* * * * *